United States Patent [19]

Kotcharian

[11] 4,133,181

[45] Jan. 9, 1979

[54] METHOD OF ASSEMBLING AND LAYING A CONDUIT FOR CONVEYING A FLUID BETWEEN AN ON-SHORE POINT OF A COASTAL REGION AND AN ADVANCED OFF-SHORE POINT

[75] Inventor: Michel Kotcharian, Paris, France

[73] Assignee: Technigaz, France

[21] Appl. No.: 671,952

[22] Filed: Mar. 30, 1976

[30] Foreign Application Priority Data

May 7, 1975 [FR] France ................... 75 14376

[51] Int. Cl.² ............... F16L 1/00; F16L 1/04
[52] U.S. Cl. ................... 405/159; 405/170; 405/113; 405/171
[58] Field of Search ........... 61/72.1, 72.3, 110–114, 61/105, 106, 109, 72.2

[56] References Cited

U.S. PATENT DOCUMENTS

| 1,603,106 | 10/1926 | Ferry et al. | 61/72.3 |
| 1,671,679 | 5/1928 | Marston | 61/106 X |
| 1,744,102 | 1/1930 | Burke | 61/72.2 |
| 1,874,081 | 8/1932 | Burrows | 61/72.3 |
| 1,946,389 | 2/1934 | Christiansen | 61/72.3 |
| 3,706,125 | 12/1972 | Hopkins | 61/105 X |

FOREIGN PATENT DOCUMENTS

| 1227145 | 8/1960 | France | 61/105 |
| 109710 | 8/1966 | Norway | 61/110 |

*Primary Examiner*—Dennis L. Taylor
*Attorney, Agent, or Firm*—Steinberg & Blake

[57] ABSTRACT

Method of assembling and laying at least one fluid conveying conduit between an on-shore point and an advanced off-shore point, including erecting, regularly on the bottom of the sea, partially emersed pillars, prefabricating conduit sections before or after erecting the pillars, mounting said sections between and at least partially supporting the same on the successive pillars and interconnecting these sections. Where there are at least three conduits, they may be provided in a bunch arrangement and suspended between the pillars. Where the conduits are partially immersed, they are provided with a rising branch at each end to be connected one to another above the level of the sea.

9 Claims, 6 Drawing Figures

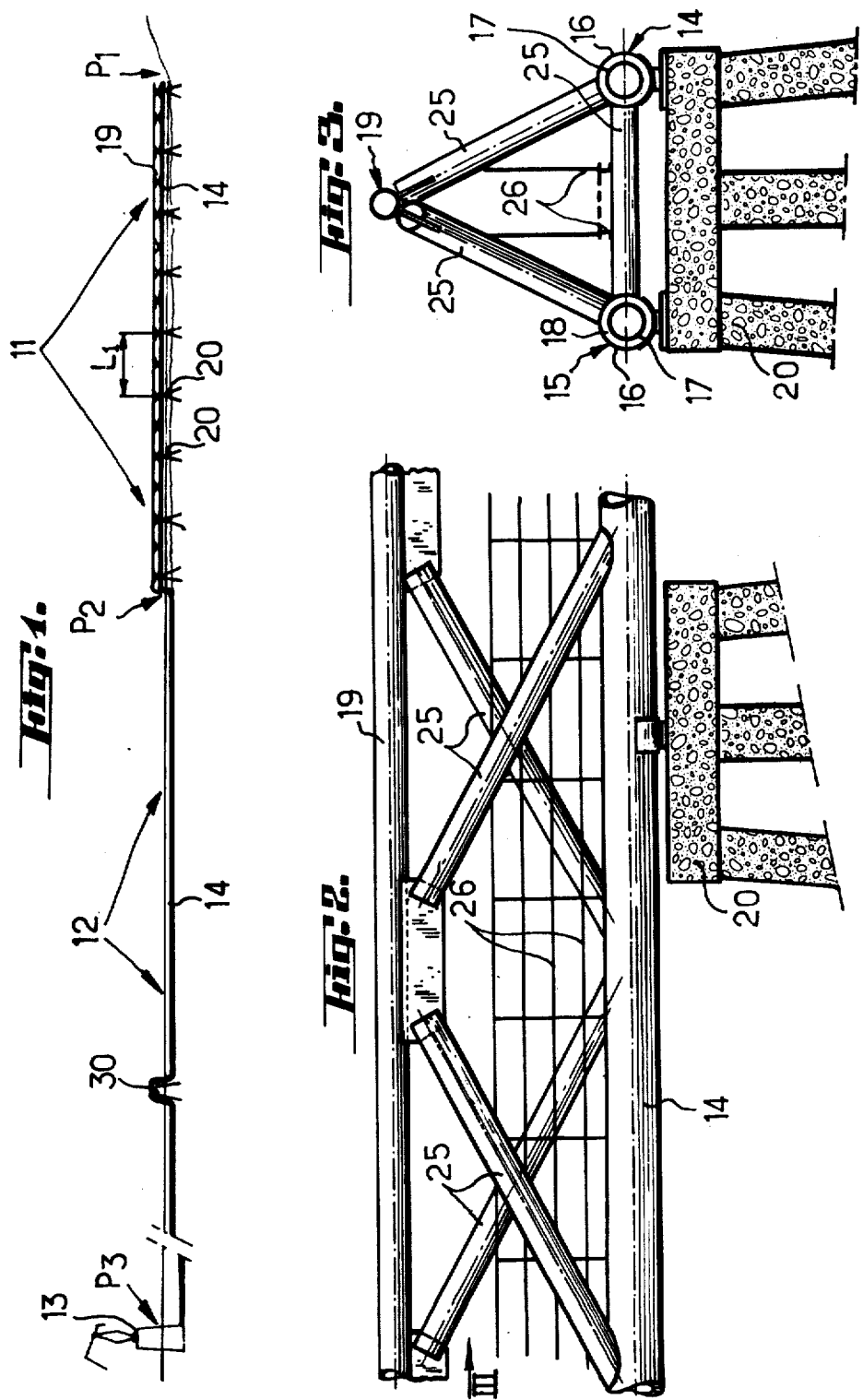

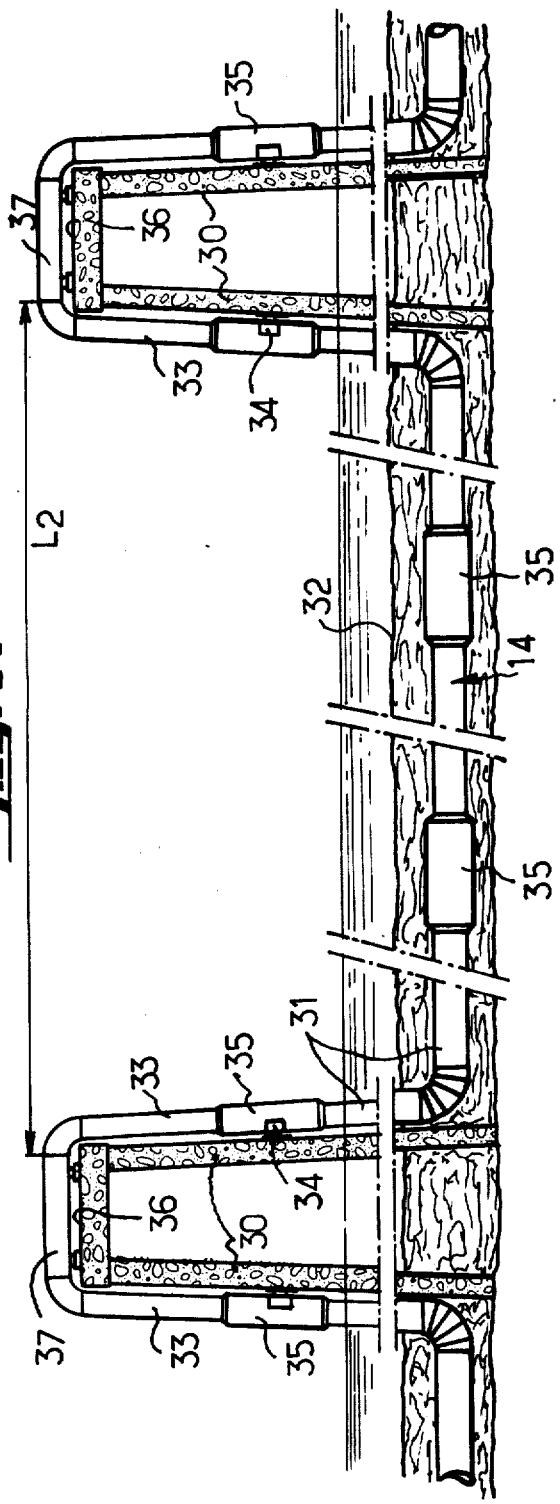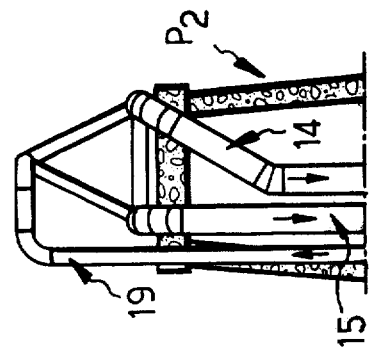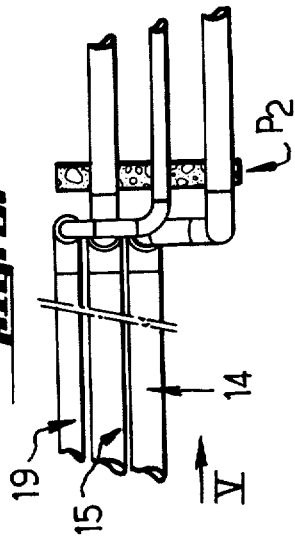

METHOD OF ASSEMBLING AND LAYING A CONDUIT FOR CONVEYING A FLUID BETWEEN AN ON-SHORE POINT OF A COASTAL REGION AND AN ADVANCED OFF-SHORE POINT

The present invention relates essentially to the laying and assembling of one or several conduits for conveying a fluid between an on-shore point of a coastal region and an advanced off-shore point. More particularly, the invention applies to the conveyance of petroleum or liquefied natural gas with a view to performing the lading or unlading of a large-tonnage ship in regions deprived of a deep-water harbor.

It is known that large-tonnage oil tankers or even some methane tankers cannot berth in some coastal regions where the provision of artificial harbor facilities would, on the other hand, be too expensive. Under such conditions, use is often made of an advanced off-shore lading and/or unlading point connected by appropriate lines to oil-tanks located on the coast or at natural gas liquefaction works. Depending upon the coastal sites and in particular upon the slope of the continental shelf at that place, the advanced, off-shore lading point may be several kilometers and even several tens of kilometers distant from the coast. It is readily understood that the laying of lines to supply a lading tower located at the aforesaid advanced off-shore point is of a nature to raise intricate technological problems which have been solved up to the present only very imperfectly by resorting to expensive methods, the carrying out of which is technologically complicated.

Several solutions have been tried. Thus, underwater conduits were laid on the bottom of the sea or buried therein. This solution raised huge problems during the laying and connecting operations, in particular because the various lengths intended to be connected to constitute the conduit or conduits had to be assembled under the level of the sea, thus rendering very difficult the fluid-tightness control of the successive connections. On the other hand, the areas nearest to the coast are frequently those where disturbances are produced by breakers even under the level of the sea, thus additionally increasing the difficulties involved in the laying of underground conduits at those places as well as their liability to damage subsequent to mounting. An attempt has also been made to achieve entirely emersed conduits, but owing to the low load-carrying capacity or mechanical strength of the conduits, the number of pillars erected on the bottom of the sea at regular intervals to support the line elements had to be multiplied, so that the cost of such an installation generally proves to be probihitive when the lading tower had to be erected very far off the shore.

The present invention is remarkable in particular in that it provides economically advantageous solutions for both types of construction, i.e. for underwater installation, on the one hand, and for the laying of emersed lines, on the other hand.

Thus, the invention relates essentially to a method of assembling and laying at least one conduit for conveying a fluid between an on-shore point of a coastal region and an advanced off-shore point, characterized in erecting on the bottom of the sea, at substantially regular intervals, partially emersed pillars, prefabricating conduit sections either before or after erecting the pillars, the lengths of the said sections corresponding to the intervals between the said pillars, and mounting the said sections between and at least partially supporting the same on the successive pillars, and connecting these sections with one another, above the level of the sea.

The conduit sections between the pillars may be emersed or immersed. In the case of emersed sections, the sections of several conduits are formed into bunches, the mechanical strength and more particularly the load-carrying capacity of which is higher than that of any one of the conduit sections constituting the said bunches, so that the latter are suspended between spaced pillars, the distance between which corresponds to this increased mechanical strength. This manner of arranging the conduits in rigid bundles thus allows to reduce the number of pillars. On the other hand, where the conduit sections are immersed between the pillars, these sections are prefabricated in order to guarantee a reliable fluid-tightness of the immersed portions and each section is provided with a rising branch at each end. The said branches are secured to the pillars so as to emerge from the sea and so that the rising branches of two successive sections, secured to one and the same pillar, by twos, the said securing being performed in the dry state, above sea level, on a pillar forming a platform. The sections intended to be immersed are taken to the place of installation in the simplest manner, i.e. by being floated and towed by a small-tonnage towing ship or vessel.

The invention also provides for a combination of both solutions, the "emersed" installation being used between the aforesaid on-shore point and an advanced intermediate off-shore point, in the region affected by breakers, whereas the "immersed" installation follows between the said advanced intermediate off-shore point and the lading tower.

The invention will be better understood and other purposes, details and advantages of the latter will appear more clearly as the following explanatory description proceeds, the said description being given only by way of example with reference to the appended non limitative drawings wherein:

FIG. 1 is a general elevational view of an installation for conveying liquefied natural gas between an on-shore point of a coastal region and an advanced off-shore lading and/or unlading tower;

FIG. 2 is a detailed view, to a larger scale, of a portion of the installation of FIG. 1;

FIG. 3 is a view according to arrow III of FIG. 2;

FIG. 4 is another detailed view, to a larger scale, of another portion of the installation of FIG. 1; and FIGS. 5 and 6 are two detailed views illustrating the connection of the conduits between the emersed portion and the immersed portion of the installation, and the advanced intermediate off-shore point.

Referring to the drawings, FIG. 1 illustrates an installation for conveying a fluid between an on-shore point $P_1$ of a coastal region and an advanced off-shore point $P_3$ where a tower 13 for lading and/or unlading a liquefied natural gas tanker is erected. The installation which is being described comprises two quite different portions, namely an emersed portion 11 located between the point $P_1$ and an advanced intermediate off-shore point $P_2$ and a partially immersed portion 12 connecting the point $P_2$ to the point $P_3$ where the lading tower 13 is erected. The region located between the points $P_1$ and $P_2$ is a region affected by breakers. FIGS. 2 and 3 show more clearly the nature of the conduits interconnecting the points $P_1$ and $P_2$. There are seen two liquefied natural gas conveying conduits 14 and 15 and a recovery conduit 19 through which the liquefied gas fraction evaporated during the lading is returned to the shore. In a quite conventional manner, the conduits 14 and 15 comprise an outer casing 16, an inner casing 17 or cryogenic pipe in which the liquefied natural gas flows, whereas the space defined by the casings 16 and 17 is filled with an appropriate heat-insulating material 18.

According to an important feature of the invention, the portion of the installation represented between $P_1$ and $P_2$ is constituted by the connection of bunches of sections (lengths $L_1$) of the three conduits 14, 15 and 19. Each bunch is suspended between two partially emersed pillars 20 erected on the bottom of the sea. As clearly shown in FIG. 3, the bunches are triangular in cross-section, each corner of the triangle being formed by a section of conduit 14, 15 or 19. Tubular metal beams 25 in lattice arrangement are secured between the parallel conduits so as to impart a certain rigidity to the bunch, which is self-carrying over a length $L_1$. This manner of arranging the conduits in a bunch allows the spacing between the pillars 20 to be increased. It may be noted that the conduits 14 or 15 usually require support to be spaced twelve meters from one another, whereas the bunch arrangement as represented, using the same conduits, allows the pillars 20 to be spaced 70 m from one another. The bunches are made on land, and sections of a foot-bridge or the like 26 for the supervision and maintenance of the emersed portion of the installation can be advantageously placed between the triangular section space defined by the conduits 14, 15 and 19.

FIG. 4 shows more specifically the arrangement of the conduits between the points $P_2$ and $P_3$. On this Figure, only the conduit 14 appears, conduits 15 and 19 being mounted in the same manner side by side over the whole length of the run. It is thus seen that each conduit is formed by an assembly of sections over a length $L_2$ mounted between the partially emersed pillars 30 erected on the bottom of the sea. The length $L_2$ is much greater than the length $L_1$ since the conduit sections 31 all along the run $P_2$, $P_3$ are not suspended between the pillars 30. On the contrary, as shown in FIG. 4, the greater part of each section 31 is buried in the continental shelf 32 and provided at each end with a rising branch 33 emerging from the sea and secured along the pillars 30. The fastening may be performed by means of a metal bow-shaped support 34 secured to the pillar 30 and welded on the outer casing of the corresponding rising branch 33. According to FIG. 4, the support 34 is secured to the rising branch 33 at the level of an expansion compensator 35. Similar compensators 35 are arranged at substantially regular intervals over the whole length of the conduits 14 and 15, including the emersed portion located between the points $P_1$ and $P_2$. Typically, a compensator is provided every 200 m. The conduit sections 31 are entirely prefabricated on land, together with their rising branches 33, and are interconnected at the upper platform 36 of each pillar 30, e.g. by means of connecting conduit elements 37. Measuring and control devices may be placed on the platform 36 together with one or several safety valves. In FIG. 4, horizontal portions of sections 31 are shown to be buried, but, if the surface of the sea bottom is not too rugged, the sections 31 may be purely and simply laid on the continental shelf 32.

FIGS. 5 and 6 show the manner in which the conduits 14, 15 and 19 are connected to the point $P_2$, FIG. 6 being a top view, whereas FIG. 5 is a transverse view in the direction of arrow V of FIG. 6. At this place, conduits 14, 15 and 19 "dip" into the sea and the bunch arrangement of these conduits is replaced by a co-planar arrangement. Starting from point $P_2$, the pillars 30 may be spaced a quite considerable length $L_2$ apart, e.g. 1 kilometer. The installation is performed in the following manner. For the emersed portion, each bunch is conveyed to the place where it must be laid and connected by being advanced along the bunches already mounted and suspended between the pillars 20, and after reaching its laying location said bunch is suspended between two pillars until the point $P_2$ is reached.

The mounting and connection of the sections 31 is altogether different. Means allowing these sections prefabricated on land to be floated (buoys, empty oil casks or the like) are associated with the said sections and the latter are conveyed by means of a small-tonnage towing ship to their place of immersion, i.e. between two successive pillars 30. At this place, the conduit section is immersed in such a manner as to allow its horizontal portion to rest upon or be buried in the bottom of the sea and the rising branches 33 are fastened to the uprights of the corresponding pillars 30. Thereafter, the rising branches fastened to one and the same pillar 30 are readily interconnected on the platform 36 by means of a connecting element 37. Apart from the fact that the sections 31 can be conveyed to the place of laying by means of a small-tonnage vessel or ship, it may be observed that in this manner all the operations for sealingly interconnecting the conduit sections can be carried out above the level of the sea. The fluid-tightness of the sections 31 itself is quite reliable since they are entirely prefabricated and tested on land.

Of course the invention is by no means limited to the form of embodiment just described and to the method of mounting just set forth. In particular, it is quite obvious that the sequence of certain operating steps of the mounting method may be changed without the final result being modified and, therefore, without departing from the scope of the present invention. This means that the invention covers all technical equivalents to the means used if the latter are used within the scope of the following claims.

What we claim is:

1. Method intended for assembling and laying at least three fluid conveying conduits in parallel relationship, between an on-shore point of a coastal region and an advanced off-shore point, comprising the steps of erecting on the bottom of the sea, at substantially regular intervals, partially emersed pillars, prefabricating before or after erecting said pillars conduit sections having lengths corresponding to the intervals between the said pillars, mounting the said sections between and supporting the same at least partially on successive pillars, and interconnecting said sections above the level of the sea, and including the steps of assembling sections of the three conduits in bunch arrangement in such a manner that the mechanical strength of each bunch thus formed is greater than that of one of the conduit sections, suspending the said bunches between the said pillars, the latter being spaced from one another at a distance greater than that required for one of the conduit sections and corresponding to the said increased mechanical strength, and connecting the successive conduit sections of said bunches respectively to one another.

2. Method of assembling and laying at least one fluid conveying conduit between an on-shore point of a coastal region and an advanced off-shore point, characterized in that it comprises the steps of erecting on the bottom of the sea, at substantially regular intervals, partially emersed pillars, prefabricating before or after erecting said pillars conduit sections having lengths corresponding to the intervals between the said pillars, mounting the said sections between and supporting the same at least partially on successive pillars, and interconnecting said sections above the level of the sea, and providing each section with a rising branch at each end, immersing each section between two successive pillars to rest upon the bottom of the sea with said rising branches emerging from the sea adjacent to and upwardly along successive pillars, respectively, fastening said rising branches to said pillars respectively adjacent thereto with the rising branches of two successive sections being fastened to one and the same pillar and interconnected so as to ensure the continuity of the said conduit.

3. Method for assembling and laying at least three fluid conveying conduits in parallel relationship, between an on-shore point of a coastal region and an advanced off-shore point, comprising the steps of erecting on the bottom of the sea, at substantially regular intervals, partially emersed pillars, prefabricating before or after erecting said pillars conduit sections having lengths corresponding to the intervals between the said pillars, mounting the said sections between and supporting the same at least partially on successive pillars, and interconnecting said sections above the level of the sea, and including the steps of dividing said pillars into into a first series of pillars erected between the said on-shore point and an intermediate off-shore point and into a second series of pillars, with a different spacing, erected between the said intermediate point and the said advanced off-shore point, assembling sections of the three conduits in a bunch arrangement so that the mechanical strength of each bunch thus formed is greater than that of one of the conduit sections, suspending the said bunches between the said pillars of the said first series with the latter pillars being spaced from one another at a distance greater than that required for one of said conduit sections and corresponding to the increased mechanical strength, interconnecting successive conduit sections of successive bunches respectively to one another, prefabricating other sections of the said three conduits with a rising branch at each end, immersing each of said other conduit sections between two successive pillars of the said second series to rest upon the bottom of the sea or be buried therein with the said rising branches emerging from the sea, upwardly along and adjacent to successive pillars of said second series, fastening the said rising branches to said pillars respectively adjacent thereto, and interconnecting the rising branches of the two successive sections of one and the same conduit which are fastened to one and the same pillar, and connecting the conduit sections of the last bunch respectively to rising branches of the first immersed conduit sections, so as to ensure the continuity of the said conduits between the said on-shore point and the said advanced off-shore point.

4. Method according to claim 2, including the steps of floating the sections provided with rising branches and conveying them by means of a towing vessel or ship to their place of immersion between two successive pillars.

5. Method according to claim 1, including the step advancing some of said bunches to their place of laying and connection along bunches already mounted and suspended between pillars.

6. Method according to claim 3, including the steps of floating the sections provided with rising branches and conveying them by means of a towing vessel or ship to their place of immersion between two successive pillars, and advancing some of said bunches to their place of laying and connection along branches already mounted and suspended between pillars.

7. Installation for conveying a fluid between an on-shore point of a coastal region and an advanced off-shore point, comprising at least one conduit partially immersed over at least a portion of its length, and formed on the said portion by conduit sections resting on the bottom of the sea or buried therein, each section being provided at each end with a rising branch emerging from the sea, a pillar erected on the bottom of the sea between each pair of successive conduit sections adjacent rising branches thereof, the latter rising branches extending upwardly along said pillar and being fastened thereto, the rising branches of two successive sections being secured to one and the same pillar and interconnected above the surface of the water.

8. Installation for conveying a fluid between an on-shore point of a coastal region and an advanced off-shore point, the said installation comprising at least three parallel fluid-conveying conduits entirely emersed in a first region between the said on-shore point and an intermediate off-shore point and formed at the said first region of interconnected bunches of sections of the said three conduits, each bunch having a rigid self-carrying structure, and two partially emersed pillars erected on the bottom of the sea and between which each bunch of conduit sections is suspended, said conduits being partially immersed in a second region between said intermediate point and the said advanced off-shore point and formed in the said second region by conduit sections resting upon the bottom of the sea or buried therein, and each of the latter conduit sections being provided at each end with a rising branch emerging from the sea, and a pillar erected on the bottom of the sea adjacent rising branches of each pair of the latter sections, the rising branches of two successive sections of one and the same conduit being fastened to one and the same pillar and interconnected above the surface of the water.

9. Installation according to claim 8, each bunch having in cross-section the configuration of a triangle each corner of which is formed by a conduit section, and metal beams in lattice arrangement secured between the parallel conduits.

* * * * *